United States Patent [19]

Cucinella et al.

[11] 4,032,703
[45] June 28, 1977

[54] PROCESS FOR THE POLYMERIZATION OF UNSATURATED COMPOUNDS

[75] Inventors: Salvatore Cucinella; Alessandro Mazzei, both of San Donato Milanese, Italy

[73] Assignee: Snam Progetti S.p.A., Milan, Italy

[22] Filed: July 1, 1975

[21] Appl. No.: 592,249

[30] Foreign Application Priority Data

July 1, 1974  Italy .................................. 24659/74

[52] U.S. Cl. .................................. 526/163; 526/335
[51] Int. Cl.² ...................... C08F 4/64; C08F 4/68; C08F 4/60; C08F 36/08
[58] Field of Search .................... 260/94.3; 526/163

[56] References Cited

UNITED STATES PATENTS

| | | | |
|---|---|---|---|
| 3,245,976 | 4/1966 | Marconi et al. | 260/94.3 |
| 3,432,516 | 3/1969 | Marconi et al. | 260/94.3 |
| 3,468,867 | 9/1969 | Marconi et al. | 260/94.3 |
| 3,476,734 | 11/1969 | Marconi et al. | 260/94.3 |
| 3,905,913 | 9/1975 | Corbellini et al. | 260/94.3 |

FOREIGN PATENTS OR APPLICATIONS 1,013,363  12/1965  United Kingdom

Primary Examiner—Alan Holler
Attorney, Agent, or Firm—Ralph M. Watson

[57] ABSTRACT

Compounds having at least one olefinic unsaturation (e.g. isoprene) are polymerized in the presence of a catalyst system consisting of a transition metal compound such as $TiCl_4$ and an aluminum hydride derivative which is either (a) an oligomer N-alkylaminoalane of the type:

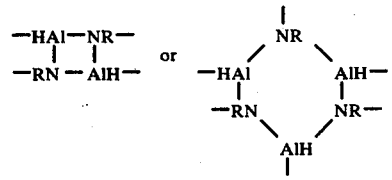

or (b) an oligomer derivative having the general formula:

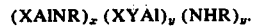

5 Claims, No Drawings

PROCESS FOR THE POLYMERIZATION OF UNSATURATED COMPOUNDS

The present invention relates to an improved process for the polymerization of compounds containing at least one olefinic unsaturation by means of a catalyst system constituted by a transition metal compound and a hydride derivative of aluminum selected from a. oligomer N-alkyl-iminoalanes having the composition $-(AlH-NR)-_n$ in which R is an aliphatic, cycloaliphatic or aromatic hydrocarbon radical and $n$ is an integer lower than or equal to 10, constituted by a variety of condensed four and/or six atom rings of the type

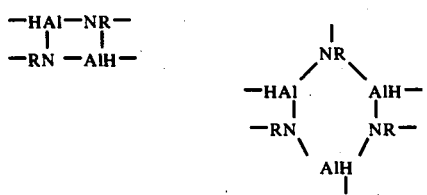

(I)

i.e. by structures wherein these rings have unities (HAl-NR) in common and hydride hydrogen atoms which may be also partially substituted by halogen atoms.

The term "hydride hydrogen" refers to the hydrogen atoms directly bound to aluminum, which can be analytically determined according to known methods;

b. oligomer derivatives having the following general formula $$(X\ Al\ NR)_x\ (X\ Y\ Al)_y\ (NHR)_y \qquad (II)$$

in which R is an aliphatic, aromatic, cycloaliphatic hydrocarbon radical, X and Y, the same or different, mean hydride hydrogen and/or halogen atoms directly bound to aluminum, the halogen atom number being lower than $x + 2y$ and the difference therefrom being constituted by hydride hydrogen atoms; the $x + y$ sum is an integer lower than or equal to 10, $y$ being an integer other than zero.

In the aforesaid formula $x$ and $y$ do not necessarily refer to repeated imine or amine unities having the same composition, based on the meanings of X and Y.

The compounds having the formula (I), forming the subject of a copending application, Ser. No. 592,248, filed July 1, 1975, have a "cage" tridimensional structure show active H/Al atomic ratios equal or practically equal to 1 and N/Al ratios equal to 1.

On the other hand, the characteristic of the compounds having the formula (II), which too are the object of another copending application, Ser No. 592,247, filed July 1, 1975, is given by the following atomic ratios: N/Al = 1, (X+Y)/Al > 1.

According to a more specific figure, the compounds having the formula (II) are ring condensed mono- or polycyclic oligomer derivatives containing aluminum and nitrogen atoms. For instance they are four and/or six atom ring derivatives, exemplified by the drawings I, II and III

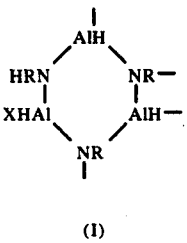

(I)

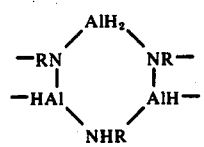

(II)

(III)

wherein the risidual valences may be partially or totally saturated by hydrogen or halogen atoms and/or may condense, with other rings of the same type or of the type IV and V

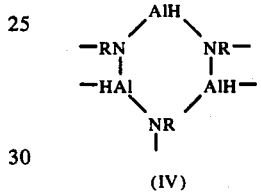

(IV)

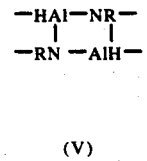

(V)

The general formula (II) refers also to compounds having open cage tridimensional structures resulting from the condensation of the abovesaid rings with imine unities and/or with 4 and/or 6 atom open rings of the type, for instance

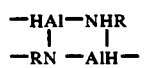  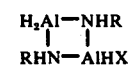  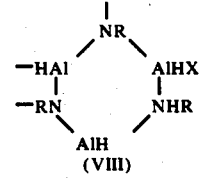

(IV)  (VII)  (VIII)

The aforesaid general formula refers also to compositions wherein the groups AlXY and NHR may be in touch or set in separated points of the molecule so that no interaction may occur without a substantial structural rearrangement.

The inventive polymerization is based on the employment of high purity co-catalysts, which give rise to clearer and more reproducible complexing, exchange, reduction reactions with transition metal compounds. Inter alia the reaction by-products, that are not directly involved in forming the catalyst centres, have predeterminated physycal-chemical properties (e.g. solubility), therefor it is possible to control and/or to avoid unwished secondary reactions (cyclization, cross-linking, chain-transfer, isomerization, etc.)

The inventive process is characterized by a catalytic activity joined to a greater polymerization reproducibility and to improved and more constant properties of the final polymer.

The inventive polymerization reaction is carried out at temperatures in the range of from −78° to +150° C, at pressures in the range of from the room one to 105 atmospheres. The operations are gradually performed in presence of a solvent inert to the catalyst, peferably selected from aliphatic, aromatic, cycloaliphatic hydrocarbons.

According to the monomer to be polymerized, the yield as solid polymer and the physical-chemical, mechanical, dynamic, etc., properties thereof are affected by the cocatalyst/catalyst molar ratio, expressed as hydride hydrogen/transition metal atomic ratio, this ratio being preferably equal to or higher than 1.

The catalyst-cocatalyst interaction may be effected either in the presence or in the absence of the monomer to be polymerized, and, in the second case, the reaction mixture may be aged for different times at temperature equal to or different from the polymerization one.

EXAMPLE 1

By operating under a nitrogen atmosphere 90 ml of hexane, 0.64 mmole of $TiCl_4$ and $(HAl-N-iso-C_3H_6)_6$ in an amount equivalent to 0.93 m atoms of Al were introduced into a bottle having 200 ml capacity.

Hydrogen developed and a brown precipitate formed.

The reaction mixture was aged at room temperature for 10 minutes, then 20 g of isoprene were added.

The bottle was sealed by a neoprene crown-closed plug and put on a rotating carrier in a bath thermostated at 30° C.

This temperature was kept for 2 hours, then the bottle was opened and the content was poured into 800 ml of methyl alcohol to which an antioxidant had been had added. The coagulated white polymer, of an elastic form, was dried under vacuum at 50° C for 20 hours. 8.3 g of a solid polymer were obtained having the following enchainment of the monomer unities:

1.4 cis % = 96,8
1.4 trans % = 0
1,2 % = 0
3,4% = 3,2
total unsaturations = 96.9.
$[\eta]$ in toluene at 30° C was 6.29 dl/g.

EXAMPLE 2

Under the same operating conditions as example 1 isoprene was polymerized by using $(HAl-N-iso-C_4H_9)_6$ together with $TiCl_4$ according to the following recipe hexane = 90 ml
$TiCl_4$ = 0,64 mmole
$(HAl-N-iso-C_4H_9)_6$ = an amount equivalent to 0.8 m. atoms of Al At the end 6.5 g of dry elastic polymer were obtained in which the monomer unity enchainment was 1,4 cis % = 96.5
1,4 trans % = 0
1,2% = 0
3,4% = 3.5
total unsaturation = 93.6.
$[\eta]$, in toluene at 30° C, was 4.69 dl/g.

EXAMPLE 3

Under the same operating conditions as example 1, isoprene was polymerized by employing $(HAl-N-tert-C_4H_9)_4$ together with $TiCl_4$ according to the following recipe:

hexane = 90 ml
$TiCl_4$ = 0.64 mmole
$(HAl-N-tert-C_4H_9)_4$ = an amount equivalent to 0.83 m.atoms of aluminium.

At the end 8.7 g of dry elastic polymer were obtained having the following enchainment of the monomer unities:

1,4 cis = 96.7%
1,4 trans = 0%
1,2 = 0%
3,4 = 3.3%; total unsaturation = 105
$[\eta]$ in toluene at 30° C was 3.6.

EXAMPLE 4

Under the same operating conditions as example 1, isoprene was polymerized by using $(HAl-N-tert-C_4H_9)_4$ together with $TiCl_4$ according to the recipe:

hexane = 90 ml
$TiCl_4$ = 0.64 mmole
$(HAl-N-tert-C_4H_9)_4$ in an amount equal to 0.93 m atom of aluminium.

At the end 7.9 g of dry elastic polymer were obtained having the monomer unity enchainment;

1,4 cis = 97.2%,
1,4 trans = 0%;
1,2 = 0%;
3,4 = 2.8%;
total unsaturations = 111
$[\eta]$ at 36° C in toluene, was 4.9.

EXAMPLE 5

Under the same operating conditions as Example 1, isoprene was polymerized by employing $(HAl-N-tert-C_4H_9)_3$ $(ClAl-N-tert-C_4H_9)_1$ together with $TiCl_4$ according to the recipe:

hexane = 90 ml
$TiCl_4$ = 0.64 mmole
$(HAl-N-tert-C hd 4H_9)_3$ $(ClAl-N-tert-C_4H_9)$ in a amount corresponding to
1.025 aluminium m.atoms.

At the end 7.8 g of dry elastic polymer were obtained having the following enchainment of the monomer unities:

1,4 cis = 96.6%;
1,4 trans = 0%;
1,2 = 0.1%;
3,4 = 3.3%;
total unsaturation = 96.2
$[\eta]$ in toluene at 30° C was 5.68.

What we claim is:
1. Process for the polymerization of compounds containing at least one olefinic unsaturation characterized in that the reaction is carried out in the presence of a catalyst system consisting of a transition metal compound together with an aluminum hydride derivative selected from
a. oligomer N-alkyliminoalanes consisting of a variety of four and/or six atom rings of the type

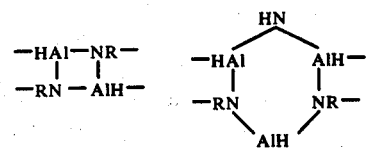

in which R is an aliphatic, cycloaliphatic or aromatic hydrocarbon radical, joined to one another to give high purity cage tridimensional structures having the composition $(HAl-NR)_n$ in which R has the aforesaid meanings n is an integer lower than or equal to 10, and the hydridge hydrogens may be also partially substituted by halogen atoms; and b. aluminum hydride ring condensed mono - or polycyclic oligomer derivatives having the general formula $$(XAlNR)_x(XYAl)_y(NHR)_u$$

in which R is an aliphatic, cycloaliphatic, or aromatic hydrocarbon radical; X and Y, the same or different, ar hydride hydrogen and/or halogen atoms directly bound to aluminum, the number of halogen atoms being lower than $x + 2y$ and the different therefrom consisting of hydride hydrogen atoms; the $x + y$ sum is an integer lower than or equal to 10, $y$ being an integer other than zero; $x$ and $y$ do not necessarily refer to repeated imine or amine unities having the same composition, based on the meansing of X and Y.

2. Process according to claim 1, characterized in that the reaction is carried out at an aluminum hydride/transition metal compound molar ratio equal to or higher than 1.

3. Process according to claim 1, characterized in that the reaction is carried out in the temperature range of from −78° to 150° C.

4. Process according to claim 1, characterized in that the reaction is carried out in the pressure range of from the room pressure to 150 atomspheres.

5. Process according to claim 1, characterized in that the reaction is carried out in the presence of a solvent selected from the aliphatic, aromatic and cycloaliphatic hydrocarbons.

* * * * *

UNITED STATES PATENT AND TRADEMARK OFFICE
CERTIFICATE OF CORRECTION

PATENT NO. : 4,032,703
DATED : June 28, 1977
INVENTOR(S) : Salvatore Cucinella and Alessandro Mazzei It is certified that error appears in the above-identified patent and that said Letters Patent are hereby corrected as shown below:

Col. 2, lines 39-41, correct formula "(IV)" to read:

$$-- \quad \begin{array}{cc} -HAl & - NHR \\ | & | \\ -RN & - AlHX \end{array} \quad --.$$

Col. 3, line 3, correct spelling of "preferably".

Col. 4, line 36, correct the formula to read:

$$--(HAl-N-tert-C_4H_9)_3 \quad (ClAl-N-tert-C_4H_9) \quad --.$$

Col. 5, line 2, correct spelling of "hydride"

line 10, correct "ar" to read -- are --.

Col. 6, line 2, correct spelling of "meanings".

Signed and Sealed this

Sixth Day of March 1979

[SEAL]

Attest:

RUTH C. MASON
Attesting Officer

DONALD W. BANNER
Commissioner of Patents and Trademarks